United States Patent
Kobayashi

(10) Patent No.: US 7,269,161 B2
(45) Date of Patent: Sep. 11, 2007

(54) TELEPHONE CONTROLLER FOR VOIP

(75) Inventor: Yoshikazu Kobayashi, Tokyo (JP)

(73) Assignee: NEC Infrontia Corporation, Kanagawa (JP)

(*) Notice: Subject to any disclaimer, the term of this patent is extended or adjusted under 35 U.S.C. 154(b) by 863 days.

(21) Appl. No.: 09/745,730

(22) Filed: Dec. 26, 2000

(65) Prior Publication Data

US 2001/0005366 A1 Jun. 28, 2001

(30) Foreign Application Priority Data

Dec. 27, 1999 (JP) ............................ 11-369252

(51) Int. Cl.
*H04L 12/66* (2006.01)
(52) U.S. Cl. ............ 370/352; 370/389; 370/401; 709/238
(58) Field of Classification Search ........ 370/352–356, 370/400, 401, 389, 475; 709/245, 238, 249, 709/250, 227, 229
See application file for complete search history.

(56) References Cited

U.S. PATENT DOCUMENTS

| 5,726,984 A | 3/1998 | Kubler et al. | |
|---|---|---|---|
| 5,870,562 A | 2/1999 | Butman et al. | |
| 5,974,453 A * | 10/1999 | Andersen et al. | 709/220 |
| 6,128,664 A * | 10/2000 | Yanagidate et al. | 709/228 |
| 6,154,465 A * | 11/2000 | Pickett | 370/466 |
| 6,393,017 B1 * | 5/2002 | Galvin et al. | 370/352 |
| 6,496,867 B1 * | 12/2002 | Beser et al. | 709/245 |
| 6,539,077 B1 * | 3/2003 | Ranalli et al. | 379/67.1 |
| 6,600,734 B1 * | 7/2003 | Gernert et al. | 370/352 |
| 6,614,774 B1 * | 9/2003 | Wang | 370/338 |
| 6,731,625 B1 * | 5/2004 | Eastep et al. | 370/352 |
| 6,731,642 B1 * | 5/2004 | Borella et al. | 370/401 |
| 6,798,767 B1 * | 9/2004 | Alexander et al. | 370/352 |
| 2006/0195540 A1 * | 8/2006 | Hamilton et al. | 709/206 |

OTHER PUBLICATIONS

Canadian Office Action date Jan. 22, 2003.

* cited by examiner

*Primary Examiner*—Seema S. Rao
*Assistant Examiner*—Robert C Scheibel
(74) *Attorney, Agent, or Firm*—Whitham Curtis Christofferson & Cook, PC

(57) ABSTRACT

The invention relates to a telephone controller that controls plural telephone sets via LAN connected to the Internet and the telephone controller is composed of a receiver that receives a message sent by a telephone set for requesting an IP address, a control circuit that generates the ID and the extension of the telephone set in case the message for requesting the IP address is received, an IP address allocation circuit that allocates the IP address of the telephone set, a memory that stores the ID, the extension and the IP address and a notifying unit that notifies the telephone set of the ID, the extension and the IP address.

11 Claims, 4 Drawing Sheets

FIG.3

| No | ID | IP ADDRESS | EXTENSION | USER NAME |
|---|---|---|---|---|
| 0 |  |  | 100 |  |
| 1 |  |  | 101 |  |
| 2 |  |  | 102 |  |
| ..... |  |  | ..... |  |

FIG.4

| No | ID | IP ADDRESS | EXTENSION | USER NAME |
|---|---|---|---|---|
| 0 | 100@soho-jp.abc.co.jp | 192,168,0,1 | 100 |  |
| 1 |  |  | 101 |  |
| 2 |  |  | 102 |  |
| ..... |  |  |  |  |

TELEPHONE CONTROLLER FOR VOIP

BACKGROUND OF THE INVENTION

1. Field of the Invention

The present invention relates to a telephone controller for VoIP.

2. Description of the Related Art

A telephone controller is installed in an organization such as a company to control plural telephone sets. This telephone controller is provided with plural ports. These plural ports and plural telephone sets are connected one to one via a line. Therefore, for example, when an extension is allocated to each telephone set, a number 100 is allocated to a telephone set connected to a first port of the telephone controller and a number 101 is allocated to a telephone set connected to a second port of the telephone controller.

Service in which packet mode communication is performed particularly using the Internet (an IP network) of cases that packet mode communication is performed in a part or the whole of a channel in conventional type telephone service is called sets and a telephone controller are connected via LAN. Therefore, it comes into question how an extension and an IP address are to be allocated to each telephone set.

SUMMARY OF THE INVENTION

Object of the Invention

An object of the invention is to provide a telephone controller that sets an extension and an IP address to a telephone set.

SUMMARY OF THE INVENTION

The invention relates to a telephone controller that controls plural telephone sets via LAN connected to the Internet and the telephone controller is composed of a receiver that receives a message sent by a telephone set for requesting an IP address, a control circuit that generates ID and an extension of the telephone set in case the message for requesting an IP address is received, an IP address allocation circuit that allocates an IP address of the telephone set , a memory that stores the ID, the extension and the IP address and a notifying unit that notifies the telephone set of the ID, the extension and the IP address.

BRIEF DESCRIPTION OF THE DRAWINGS

FIG. 3 shows a table 131 shown in FIG. 1;

FIG. 4 shows the table 131 shown in FIG. 1; and

DETAILED DESCRIPTION OF THE PREFERRED EMBODIMENTS

Figure 1:
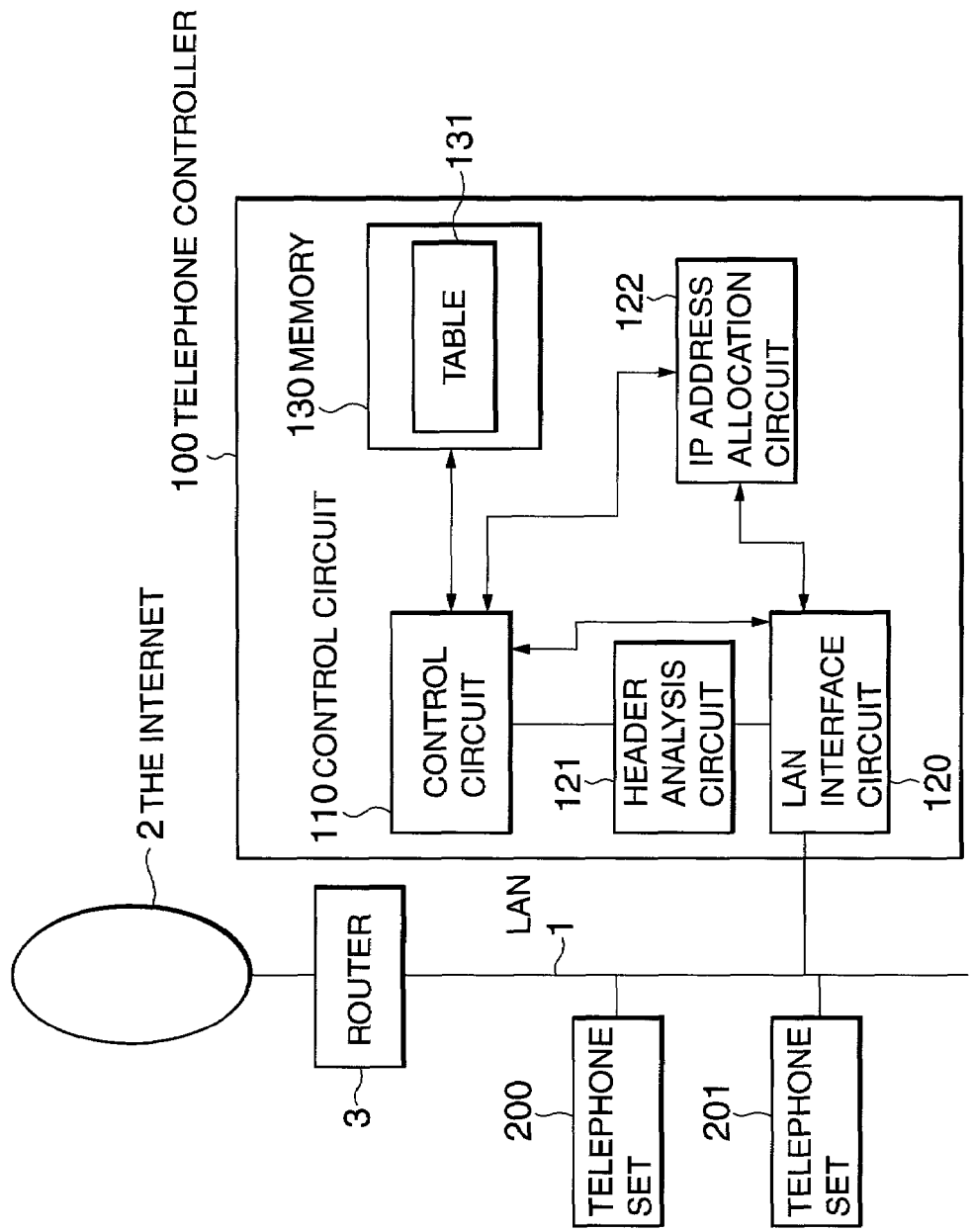
FIG. 1 is a block diagram showing an embodiment of a telephone controller according to the invention.

Next, referring to the drawings, embodiments of the invention will be described in detail.

FIG. 1 is a block diagram showing an embodiment of the invention.

As shown in FIG. 1, a telephone controller 100 controls telephone sets 200 and 201 on LAN via a LAN interface circuit 120. The telephone controller 100 is provided with a control circuit 110 that executes TCP/IP, an address allocation circuit 122 that allocates a private IP address of the telephone sets 200 and 201 according to an instruction from the control circuit 110, a header analysis circuit 121 that analyzes a header of an IP packet received from LAN1 and a memory 130 that stores a table 131 showing correspondence among ID, a private IP address, an extension and a user name. ID is represented in the form of (user name) (extension) @ (domain name), for example as kobayashi 100@soho-ip.abc.co.jp. A user name is the name of a user of each telephone set 200, 201 and a domain name "soho-ip.abc.co.jp" is a domain name on the Internet of the telephone controller 100. A user name and an extension are used to identify a telephone set controlled by the telephone controller 100. LAN1 is well-known LAN such as 10BASE-T and 100BASE-TX. In FIG. 1, two telephone sets are shown, however, three or more telephone sets may be also connected.

Figure 2:
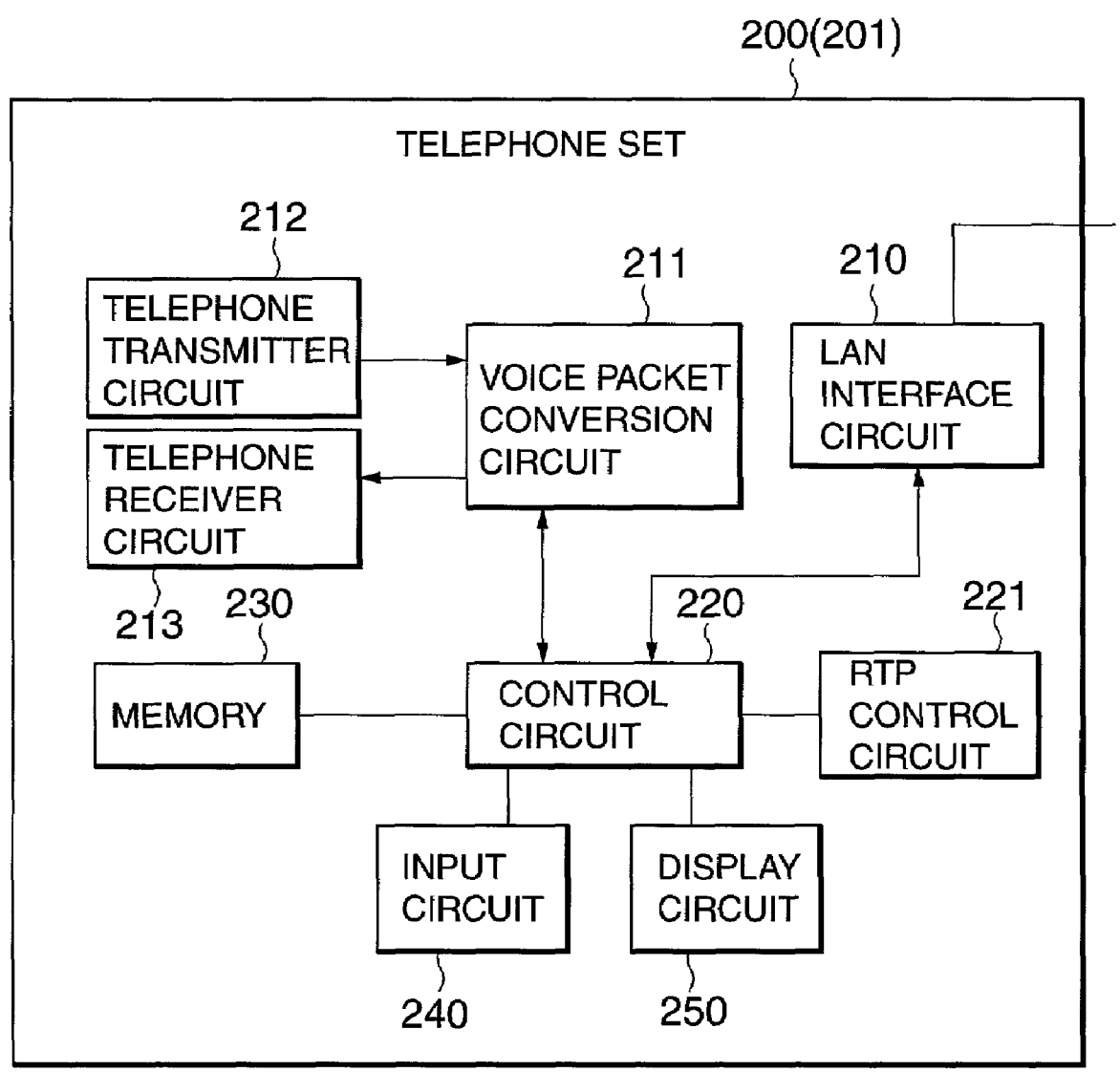
FIG. 2 is a block diagram showing an embodiment of a telephone set 200 shown in FIG. 1.

Next, the configuration of the telephone sets 200 and 201 will be described. FIG. 2 is a block diagram showing the configuration of the telephone set 200. The telephone set 200 is provided with a LAN interface circuit 210 which is connected to LAN1 and executes the protocol of LAN, a control circuit 220 that executes TCP/IP and controls the whole, an RTP control circuit 221 that controls RTP (a standard protocol for transferring voice and image data at real time), a voice packet conversion circuit 211 that treats voice in conversation, a telephone transmitter circuit 212, a telephone receiver circuit 213, a memory 230 connected to the control circuit 220, an input circuit 240 and a display circuit 250. The voice packet conversion circuit 211 encodes a speech signal from the telephone transmitter circuit 212, further packets it and sends it to the control circuit 220. The voice packet conversion circuit 211 also decodes a voice packet from the control circuit 220 and sends it to the telephone receiver circuit 213. The control circuit 220 packets an information packet such as a voice packet according to TCP/IP and sends it to the LAN interface circuit 210. The control circuit 220 also controls each circuit after analyzing a packet sent from the LAN interface circuit 210. The memory 230 receives an IP address allocated by the IP address allocation circuit 122 of the telephone controller 100, an extension and ID and stores them. The display circuit 250 displays the IP address, the extension and the ID. The input circuit 240 is a key board and others. A user can input an extension and ID to the telephone set 200 using the input circuit 240. The control circuit 220 generates a packet including the input extension and sends it to the telephone controller 100. The control circuit 220 also calls the telephone set 200 in case the control circuit receives a call incoming notice packet.

A procedure in which the telephone controller 100 generates the extension and ID of the telephone set 200 will be described below.

As shown in FIG. 1, when the telephone set 200 is connected to LAN1, it sends a packet including a predetermined header to LAN1. This packet is a message for the telephone set 200 to request the allocation of its own IP address to the telephone controller 100. The telephone controller 100 receives the message via LAN1. The header analysis circuit 121 receives the message via the LAN interface circuit 120. The header analysis circuit 121 analyzes a header in the packet and notifies the control circuit 110 that the packet is a message that requests the allocation of an IP address in case the header is a predetermined header. The control circuit 110 selects one of a set of extensions stored in the table 131 of the memory 130 beforehand. FIG. 3 shows a set of extensions stored in the table 131. Next, the control circuit 110 assigns the domain name of the telephone controller 100 to the selected extension and generates ID. The control circuit sends the ID to the IP address allocation circuit 122. The IP address allocation circuit 122 generates an IP address corresponding to the ID. A method of preparing the IP address is arbitrary. The address allocation circuit 122 sends the ID and the IP address to the control circuit 110. The control circuit 110 writes the ID and the IP address to the table 131. For example, in case an extension selected by the control circuit 110 is a number 100 and the domain name of the telephone controller 100 is soho-ip.abc.co.jp, 100@soho-ip.abc.co.jp is generated as ID. An IP address (for example, 192. 168. 0. 1) corresponding to the ID is generated. These ID and IP address are registered in the table 131. That is, as shown in FIG. 4, ID and an IP address corresponding to the extension 100 are respectively 100@soho-ip.abc.co.jp and 192. 168. 0. 1.

Next, the control circuit 110 generates a packet including the IP address and ID of the telephone set 200 via the LAN interface circuit 120 and sends it to the telephone set 200 via LAN. The telephone set 200 that receives the packet including the IP address and ID analyzes the packet in the control circuit 220 and stores the IP address, the ID and an extension in the ID in the memory 230. The display circuit 250 displays the extension.

As described above, according to the invention, the telephone set 200 can automatically acquire its ID, its IP address and its extension only by connecting the telephone set 200 to LAN1. Therefore, even if a user has no knowledge of IP and LAN, he/she can connect his/her telephone.

Next, a procedure in which the telephone set 200 specifies its own extension will be described.

When the telephone set 200 is connected to LAN1 as shown in FIG. 1, it sends a packet including a predetermined header to LAN1. This packet is a message for the telephone set to request the allocation of its own IP address to the telephone controller. This message includes an extension specified by a user of the telephone set 200. This extension is stored in the telephone set 200 by the user beforehand.

The telephone controller 100 receives the message via LAN1. The header analysis circuit 121 receives the message via the LAN interface circuit 120. The header analysis circuit 121 analyzes the header in the packet and notifies the control circuit 110 that the packet is a message requesting the allocation of an IP address and of the extension in case the header is a predetermined header. Next, the control circuit 110 assigns the domain name of the telephone controller 100 to the extension and generates ID. The control circuit sends the ID to the IP address allocation circuit 122. The IP address allocation circuit 122 generates an IP address corresponding to the ID. The address allocation circuit 122 sends the ID and the IP address to the control circuit 110. The control circuit 110 writes the extension, the ID and the IP address to the table 131 corresponding each in case the specified extension is already registered in the table 131. In the meantime, the control circuit 110 registers the extension unless the specified extension is registered in the table 131 and writes the extension, the ID and the IP address to the table 131 corresponding to each. For example, in the specified extension is a number 101 and the domain name of the telephone controller 100 is soho-ip.abc.co.jp, 101@soho-ip.abc.co.jp is generated as ID. An IP address (for example, 192. 168.0. 2) corresponding to the ID is generated. These ID and IP address are registered in the table 131.

Next, the control circuit 110 generates a packet including information of the IP address and the ID of the telephone set 200 via the LAN interface circuit 120 and sends it to the telephone set 200 via LAN.

As described above, according to the invention, the telephone set 200 can automatically acquire its ID, its IP address and its extension only by connecting the telephone set 200 to LAN1. The extension is specified by the user.

Next, an example that a message requesting the allocation of an IP address includes a user name in addition to an extension will be described.

For example, an extension is a number 101 and a user name is kobayashi. In this case, the control circuit 110 generates ID, kobayashi-101@soho-ip.abc.co.jp and an IP address corresponding to the ID. The control circuit 110 stores these ID and IP address in the table 131 and sends them to the telephone set 200.

Also, different user names such as kobayashi101@soho-ip.abc.co.jp and koike-101@soho-ip.abc.co.jp can be assigned to one extension. Hereby, a system that one telephone set is used by plural persons can be provided.

Next, call operation performed by telephone sets after the IP address and the ID are acquired will be described.

Calling operation from the telephone set 200 to the telephone set 201 will be described.

Figure 5:
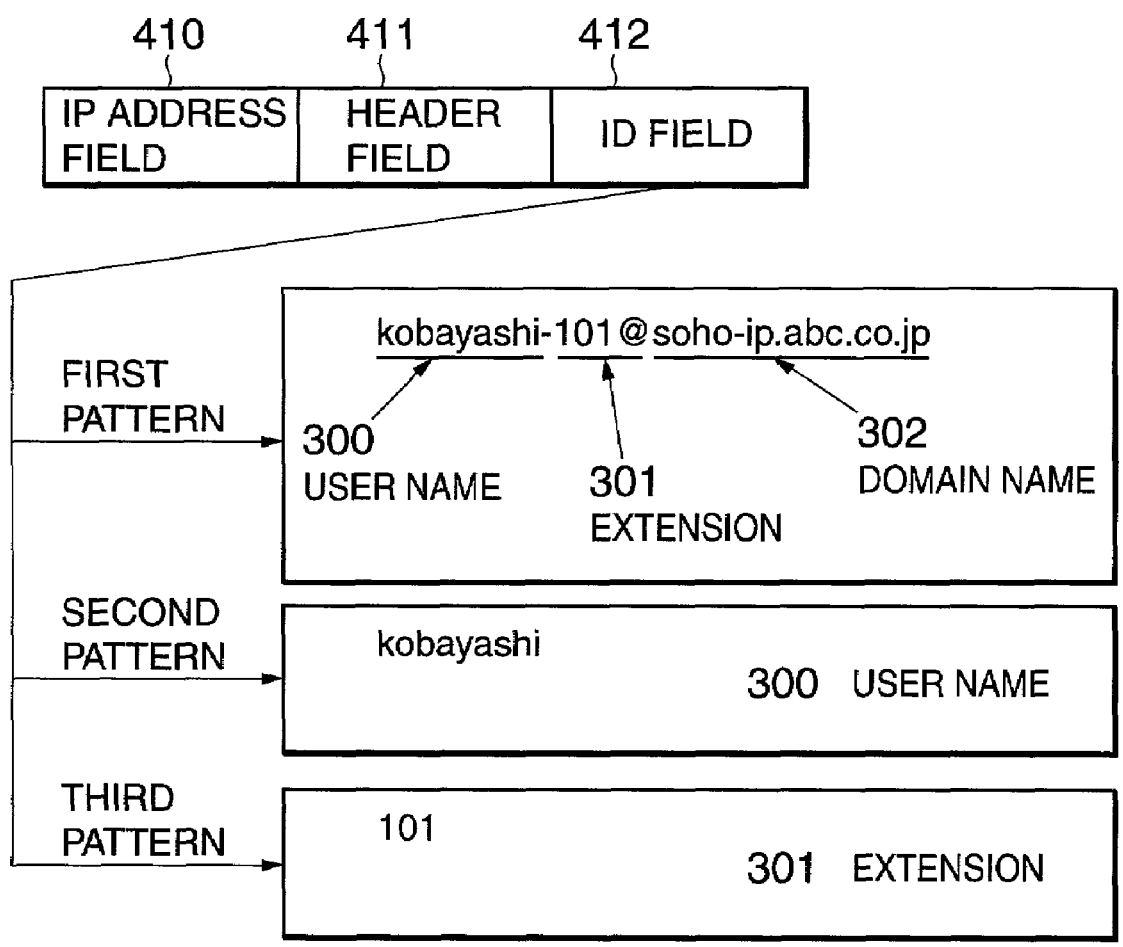
FIG. 5 shows a packet of a connection request message.

First, the telephone set 200 sends a connection request message to the telephone controller 100. The connection request message is sent in the form of a packet shown in FIG. 5. This packet is provided with an IP address 410, a header 411 showing a request for connection and ID 412. In the field of the IP address 410, the IP address of the telephone set 200 is stored. The ID 412 is the identification information of the telephone set 201. There are three patterns for specifying the telephone set 201. A first pattern is a method of setting a user name 300, an extension 301, a domain name 302 in the field of the ID 412. A second pattern is a method of setting only the user name 300 in the field of the ID 412. A third pattern is a method of setting only the extension in the field of the ID 412.

The packet shown in FIG. 4 is sent from the LAN interface circuit 210 to LAN1. This packet is sent to the header analysis circuit 121 via the LAN interface circuit 120 in the telephone controller 100. The header analysis circuit 121 sends the ID, the user name or the extension extracted from the field of the ID 412 to the control circuit 110 in case the packet is a connection request message as a result of analyzing the header. That is, in case the ID 412 of the connection request message is the first pattern, the ID is sent to the control circuit 110, in the case of a second pattern, the user name is sent to the control circuit 110 and in the case of the third pattern, the extension is sent to the control circuit 110.

The control circuit 110 retrieves the table 131 based upon the ID 412 in the packet and acquires the IP address of the telephone set 201. As a result of the retrieval, in case plural IP addresses are acquired, plural telephone sets are connected.

Next, the control circuit 110 generates a call incoming notice packet having the acquired IP address as a transmission destination IP address and sends it to the LAN interface circuit 120. The LAN interface circuit 120 sends the call incoming notice packet to the telephone set 201 via LAN1. Hereby, the telephone set 201 is called.

Next, the telephone sets 200 and 201 traffic with each other by exchanging a voice packet according to RTP under the control of the RTP control circuit 221. In a traffic state according to RTP, a conversation packet including sound is directly exchanged between the telephone set 200 and the telephone set 201 without interchange via the telephone controller 100. In this case, each telephone set transmits a voice packet by incorporating the IP address of the partner in the IP address of the destination of transmission in the packet.

According to the invention, when a telephone set is connected to LAN, ID including its extension is automatically generated by the telephone controller and the telephone set is notified of the ID including the extension together with its IP address. Hereby, the telephone set can acquire its own ID and IP address. Also, its extension can be also specified from the telephone set.

What is claimed is:

1. A telephone controller in a voice over Internet Protocol (VoIP) system that controls plural telephone sets via a LAN connected to the Internet, comprising:
    a receiver that receives a message containing a predetermined header sent via the LAN by one of the telephone sets which, when connected to the LAN, requests an IP address to be allocated for the requesting telephone set;
    a header analysis circuit connected to the receiver and which analyzes the message to determine that the received message contains the predetermined header;
    a control circuit connected to the header analysis circuit and receiving notification from the header analysis circuit that the received message contains the predetermined header and, in response, the control circuit checks a set of extensions stored in a table of available extensions and assigns a domain name of the telephone controller to a selected extension and generates an ID comprising the domain name of the telephone controller and the selected extension for the requesting telephone set;
    an IP address allocation circuit connected to receive from the control circuit the ID and, in response, the IP address allocation circuit allocates an IP address for the requesting telephone set; and
    a memory including a table, the control circuit receiving the allocated IP address from the IP address allocation circuit and storing the IP address and the ID, comprising the domain name and the extension, in the table;
    said control circuit notifying the requesting telephone set of the ID, the extension and the IP address for the requesting telephone set, whereby the telephone set automatically acquires its ID, its IP address, and its extension from the telephone controller only by connecting the telephone set to the LAN.

2. The telephone controller as recited in claim 1, wherein the ID includes, in addition to the domain name of the telephone controller and the selected extension for the requesting telephone set, a name of a user of the telephone set.

3. The telephone controller as recited in claim 2, wherein the ID includes plural user names assigned to a same extension.

4. The telephone controller as recited in claim 1, wherein the control circuit selects the extension.

5. The telephone controller as recited in claim 1, wherein a user of the telephone set selects the extension subject to the selected extension not already being registered in the table when the table is checked by the control circuit.

6. A telephone communication system, comprising:
    a telephone controller, a plurality of telephone sets, and a local area network (LAN) which is connected to the Internet and to which each of the telephone controller and the plurality of telephone sets are connected;
    wherein the control circuit includes:
    a receiver that receives a message containing a predetermined header sent via the LAN by one of the telephone sets which, when connected to the LAN, requests an Internet Protocol (IP) address to be allocated for the requesting telephone set;
    a header analysis circuit connected to the receiver and which analyzes the message to determine that the received message contains the predetermined header;
    a controller control circuit connected to the header analysis circuit and receiving notification from the header analysis circuit that the received message contains the predetermined header and, in response, the controller control circuit checks a set of extensions stored in a table of available extensions and assigns a domain name of the telephone controller to a selected extension and generates an ID comprising the domain name of the telephone controller and the selected extension for the requesting telephone set;
    an IP address allocation circuit connected to receive from the controller control circuit the ID and, in response, the IP address allocation circuit allocates an IP address for the requesting telephone set; and p1 a memory including a table, the controller control circuit receiving the allocated IP address from the IP address allocation circuit and storing the IP address and the ID, comprising the domain name and the extension, in the table;
    said controller control circuit notifying the requesting telephone set of the ID, the extension and the IP address for the requesting telephone set;
    and wherein at least one of the plurality of telephone sets includes:
    a telephone set control circuit which generates a message containing the predetermined header to the telephone controller requesting an IP address be allocated to said at least one said plurality of telephone sets; and
    a memory to which the telephone set control circuit writes the ID, the extension and the IP address as notified by the controller control circuit,
    whereby said at least one of the plurality of telephone sets automatically acquires its ID, its IP address, and its extension from the telephone controller only by connecting the telephone set to the LAN.

7. The telephone communication system as recited in claim 6, wherein said at least one of the plurality of telephone sets further comprises a display circuit connected to and responsive to the telephone set control circuit for displaying the extension of the telephone set when the control circuit receives notification from the controller control circuit.

8. The telephone controller as recited in claim 6, wherein the ID includes, in addition to the domain name of the telephone controller and the selected extension for the requesting telephone set, a name of a user of the telephone set.

9. The telephone controller as recited in claim 8, wherein the ID includes plural user names assigned to a same extension.

10. The telephone controller as recited in claim 6, wherein the control circuit selects the extension.

11. The telephone controller as recited in claim 6, wherein a user of the telephone set selects the extension subject to the selected extension not already being registered in the table when the table is checked by the control circuit.

* * * * *